May 11, 1926.
W. G. DUNCAN
PISTON AND RING
Filed Sept. 30, 1925
1,584,520
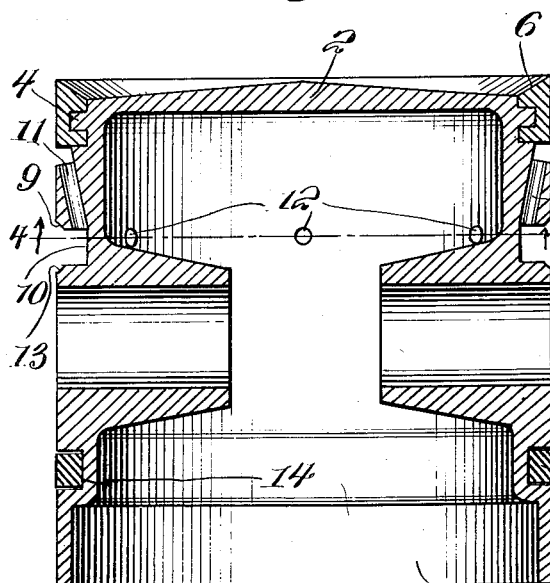
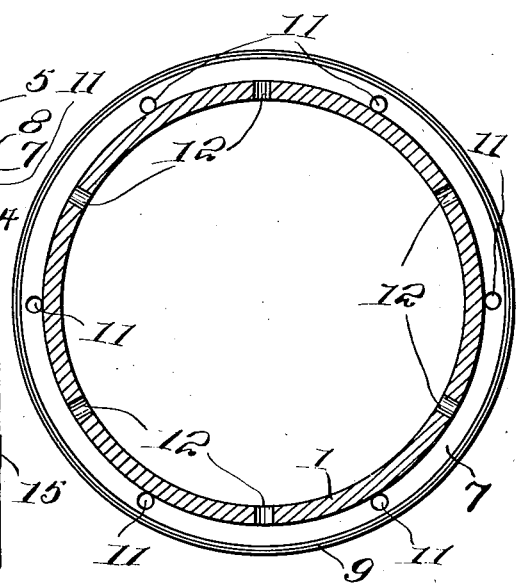
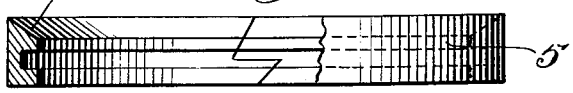
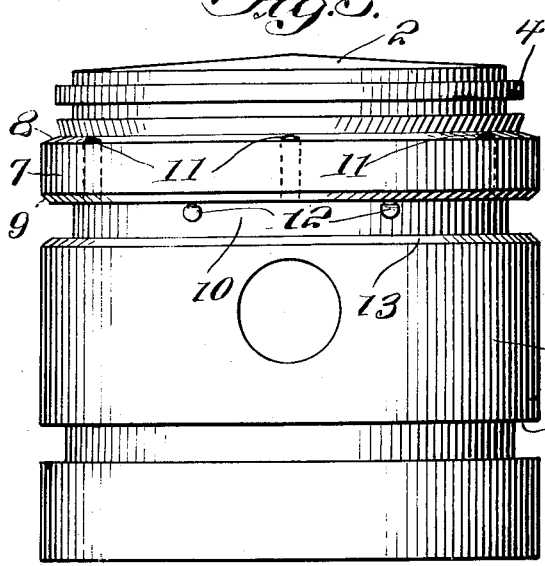
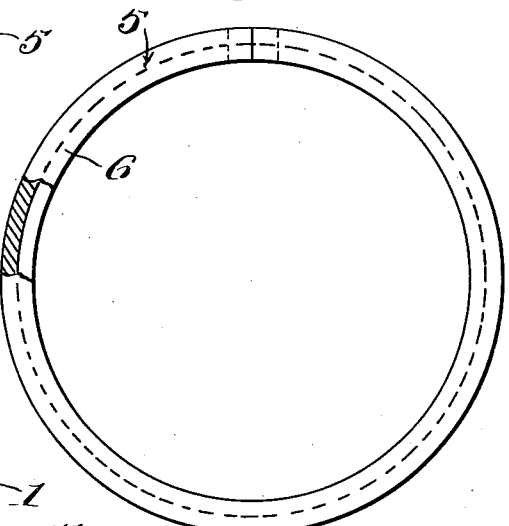
William G. Duncan
INVENTOR
BY Victor J. Evans
ATTORNEY
WITNESS J. T. L. Wright Patented May 11, 1926.

1,584,520

UNITED STATES PATENT OFFICE.

WILLIAM G. DUNCAN, OF ROCKFIELD, KENTUCKY.

PISTON AND RING.

Application filed September 30, 1925. Serial No. 59,635.

An object of this invention is the provision of a piston for internal combustion engines of a construction which will insure the proper guiding of the piston when reciprocated in a cylinder as well as to effectively lubricate the pistons and wall of the cylinder but which is of such construction as to prevent the accumulation and hardening of the lubricant.

A further object is the provision of a piston having its head flared from its center to its sides to prevent the accumulation of carbon thereon, and wherein said head is surrounded by a piston ring of a particular construction, the body of the piston, below said piston ring, being formed with continuous grooves, and the portion between the grooves having an oil receiving opening that communicates with the lower groove, the inner wall provided by the said lower groove having apertures therethrough that are staggeredly related with respect to the mentioned groove, the said lower groove thus providing a wall for the accumulated oil, and said oil finding an outlet through the lateral apertures into the hollow body of the piston, while said piston, adjacent to its lower end has seated therein a piston ring, which in combination with the first mentioned piston ring will prevent piston slaps and properly guide the piston in its reciprocatory movements in a cylinder.

To the attainment of the foregoing broadly stated objects and others which will appear as the nature of the invention is better understood, reference is to be had to the drawings which accompany and form part of this application.

In the drawings:—

Figure 1 is an approximately central vertical longitudinal sectional view through a piston in accordance with this invention.

Figure 2 is a side elevation with parts in section of the upper piston ring.

Figure 3 is a side elevation of the improvement with the piston rings removed.

Figure 4 is a sectional view on the line 4—4 of Figure 1, looking in the direction of the arrows.

Figure 5 is a top plan view of the upper or outer piston ring, with parts in section.

My improved piston is broadly indicated by the numeral 1. The piston includes the usual hollow body provided with the inwardly directed lugs having openings therethrough for the reception of the pin which provides a bearing for a connecting rod. The top 2 of the piston is dome-shaped, that is, the said top is flared downwardly from the center to the side wall of the piston. The top of the piston is of a less diameter than the body of the said piston and the reduced upper portion of the said piston is centrally formed with an annular rib 4 which is received in a groove on the inner face of the upper piston ring 5. The upper or outer piston ring comprises a split member and is beveled inwardly from its outer to its inner surface, as indicated by the numeral 6. The beveled portion 6 of the piston ring extends a slight distance above the center or apex of the top 2. Below the annular rib or tongue 4 the upper reduced portion of the piston is formed with a continuous enlargement or outwardly directed flange 7. Both the upper and lower walls of the flange 7 are flared inwardly, as at 8 and 9, respectively. The annular flange 7 provides the piston with a continuous groove 10. The flange 7, at equidistant points, has longitudinal ports or openings 11, and the inner wall formed by the depression 10 is formed with transverse apertures 12 which communicate with the hollow body of the piston. The apertures are disposed in staggered relation with respect to the openings 11, one of said apertures being arranged centrally between two of the openings 11. The apertures 12 are also arranged directly below the flange 7.

The upper wall of the body portion of the piston, that is, the portion of the piston directly below the groove 10, is preferably beveled inwardly, as at 13, and the said piston, adjacent to its lower end, has a continuous groove 14 for a piston ring 15.

The piston rings 5 and 15 properly centralize the piston in the cylinder in which it works, and the construction prevents the wabbling of the piston and the scarring of the wall of the cylinder. The conical top 2 of the piston will tend to obviate accumulation of carbon thereon. The piston 1 holds the lubricant for the piston and its cylinder from passing onto the head of the piston and likewise forces the lubricant through the openings 11 in the flange 7 into the groove 10. The groove 10 is in the nature of a lubricant well, and when the lubricant therein rises to a level with the ports 12, the said lubricant will flow through the ports into the hollow body of the piston and gravitate downwardly therethrough. By arranging the ports adjacent to the top of the oil well, a sufficient quantity of lubricant will be retained in the well to insure the proper lubrication of the piston in its cylinder.

It is believed that the foregoing description when read in connection with the accompanying drawings will fully set forth the construction and advantages of my invention to those skilled in the art to which such inventions relate, but it is to be understood that I do not wish to be restricted to the precise details of construction herein set forth and may make such changes therefrom as fairly fall within the scope of my claims without departing from the spirit or sacrificing any of the advantages of the invention.

Having described the invention, I claim:—

1. A piston comprising a member having its upper portion reduced and a conical head at its said reduced portion, a piston ring surrounding the head, said reduced portion having an integral annular flange provided at spaced intervals with longitudinal openings and defining annular grooves between the piston ring and the body of the piston, the lower groove having transverse ports communicating with the interior of the piston and disposed directly below the flange and a second piston ring seated in the body, as and for the purpose set forth.

2. A piston comprising a member having a hollow body, an upper reduced portion merging into a head which is beveled downwardly from its center to its outer surface, said piston, directly below the head being grooved to provide an annular rib and said rib designed to be received in a groove of a piston ring, the said reduced portion of the head, below the rib, having an annular flange whose outer surface is arranged in a plane with the body and defining an annular groove above the body proper, said flange, and the outer corner of the body, adjacent thereto, being flared inwardly, and the groove between the flange and the body providing a lubricant well, said flange having spaced longitudinal openings and the piston having transverse ports arranged intermediate with respect to the openings and disposed centrally therebetween and arranged approximately in alignment with the lower wall of the flange and the body of the flange having an annular groove adjacent its open end for the reception of a second piston ring.

In testimony whereof I affix my signature.

WILLIAM G. DUNCAN.